United States Patent [19]

Metzger et al.

[11] 3,937,793
[45] Feb. 10, 1976

[54] PROCESS FOR THE CONTINUOUS MANUFACTURE OF CRYSTALLIZED AMMONIUM THIOSULFATE

[75] Inventors: Adolf Metzger, Wiesbaden; Karl-Heinz Henke, Frankfurt am Main; Horst Schreiber, Kelkheim, Taunus, all of Germany

[73] Assignee: Hoechst Aktiengesellschaft, Frankfurt am Main, Germany

[22] Filed: June 18, 1973

[21] Appl. No.: 370,686

[30] Foreign Application Priority Data
June 20, 1972 Germany............................ 2230005

[52] U.S. Cl.................................. 423/514; 423/519
[51] Int. Cl.² ........................................ C01B 17/64
[58] Field of Search................................... 423/514

[56] References Cited
UNITED STATES PATENTS

| | | | |
|---|---|---|---|
| 2,219,258 | 10/1940 | Hill | 423/514 |
| 3,431,070 | 3/1969 | Keller | 423/514 |
| 3,473,891 | 10/1969 | Mack | 423/514 |

*Primary Examiner*—Earl C. Thomas
*Attorney, Agent, or Firm*—Curtis, Morris & Safford

[57] ABSTRACT

Crystallized ammonium thiosulfate is manufactured by converting ammonia with oxygen containing sulfur dioxide in ammonium thiosulfate solution to ammonium bisulfite and ammonium sulfite in a first step, while maintaining a pH of from 5.5 to 7.0 and a reaction temperature of up to 80°C. In a second step, the ammonium bisulfite and ammonium sulfite in the solution are converted with ammonia and sulfur to ammonium thiosulfate.

3 Claims, 1 Drawing Figure

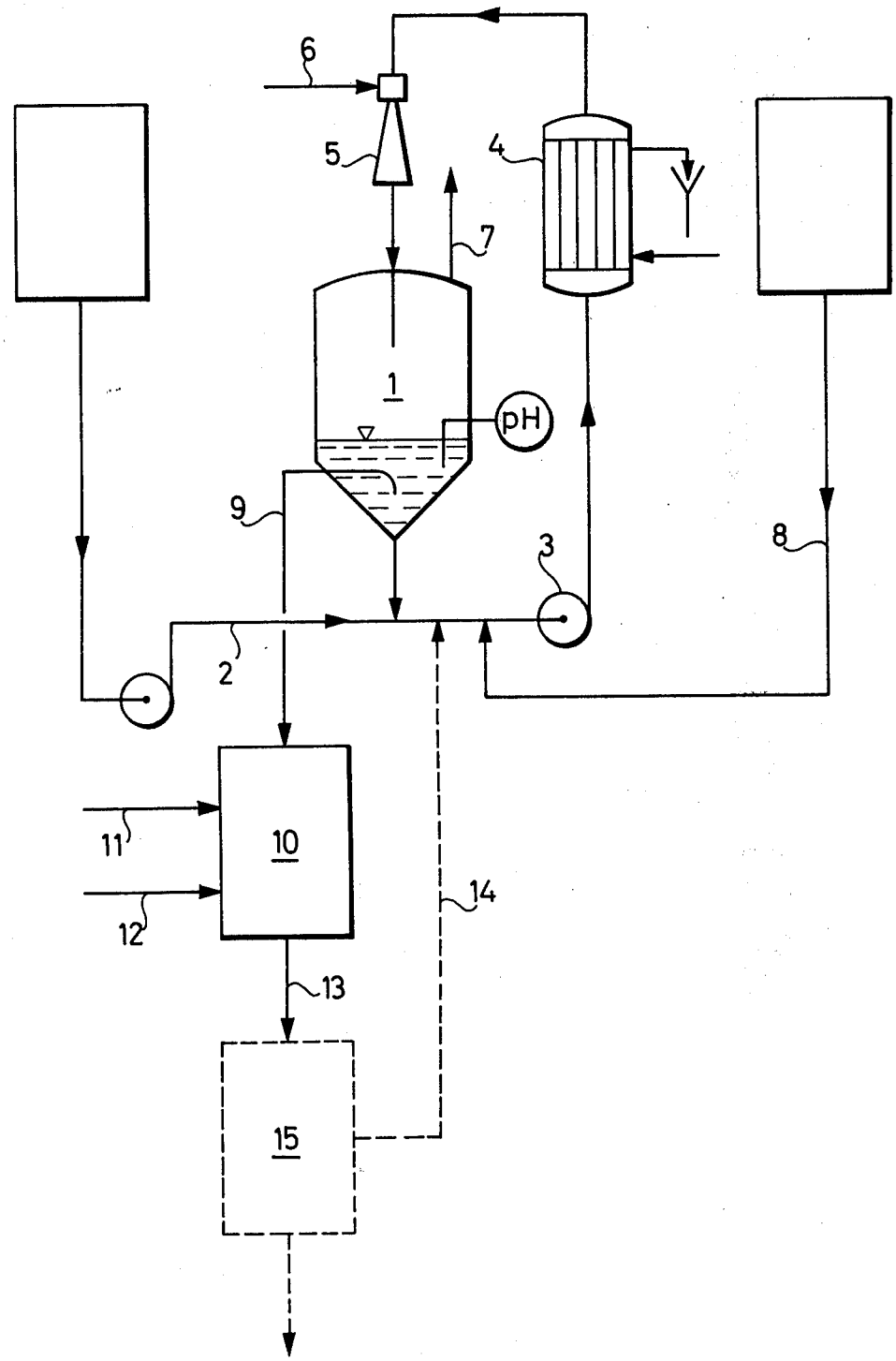

PROCESS FOR THE CONTINUOUS MANUFACTURE OF CRYSTALLIZED AMMONIUM THIOSULFATE

The present invention relates to a process for the manufacture of ammonium thiosulfate from $SO_2$ containing flue or sulfur combustion gases.

It is known to convert ammonium sulfite containing solutions or suspensions to ammonium thiosulfate by means of a slight excess of sulfur at temperatures of 80°C and more in the presence of free $NH_3$. The ammonium sulfite containing thiosulfate solution is generated in an ammonium thiosulfate mother liquor by feeding in $NH_3$ and $SO_2$. Usually, the reaction temperature of these processes is maintained at 50°C by cooling. The gaseous reactants may be fed in in the presence or absence of sulfur.

Furthermore, it is known to incite the formation of ammonium sulfite under conditions which already result in a partial conversion of the sulfite to thiosulfate, which shortens the reaction time necessary for the conversion of ammonium sulfite to thiosulfate. The reaction is generally further accelerated by operating at elevated temperatures (from 110° to 130°C).

In these processes, the mother liquor may be circulated, but in industrial practice it has been observed that in this case a perfect crystallization of the ammonium thiosulfate is only possible when the amount of ammonium sulfate in the mother liquor does not exceed about 1 %.

In order to avoid the formation of ammonium sulfate as far as possible all known processes use oxygen-free $SO_2$. According to Forster and Haufe however, ammonium sulfate is formed also in this case, the reaction corresponding to the following scheme:

$$4HSO_3^- \rightarrow S_3O_6^{2-} + SO_4^{2-} + 2H_2O$$

When oxygen containing $SO_2$ gases are used, the manufacturing process is additionally complicated by the oxidation conversion of ammonium sulfite or ammonium bisulfite to ammonium sulfate. This reaction, as Chertkov in J. appl. chem. USSR 32 (1959), pp. 2687–2690 has proved, is catalyzed by the presence of thiosulfate in the following manner:

$$SO_3^{--} + O_2 + S_2O_3^{--} + 3H^+ \rightarrow S_3O_6^{--} + OH + H_2O$$

and $$SO_3^{--} + 2OH + S_2O_3^{--} + 2H^+ \rightarrow S_3O_6^{--} + 2H_2O$$
$$S_3O_6^{--} + H_2O \rightarrow S_2O_3^{--} + SO_4^{--} + 2H^+$$

His tests prove that increasing thiosulfate concentrations accelerate considerably the oxidation conversion to sulfate.

Furthermore it is generally known that ammonium thiosulfate (heavily depending on its concentration) transforms into sulfur dioxide and sulfur in acidic solution, while in alkaline solution ammonium thiosulfate decomposes into ammonium sulfate.

It has now been found that ammonium thiosulfate can be manufactured continuously with only insignificant formation of sulfate in the presence of oxygen containing sulfur dioxide. The process of the invention comprises converting ammonia with oxygen containing sulfur dioxide in ammonium thiosulfate solution to ammonium bisulfite and ammonium sulfite in a first step, while maintaining a pH of from 5.5 to 7.0 and a reaction temperature of up to 80°C, and, in a second step, converting the bisulfite and sulfite being in the solution with ammonia and sulfur to ammonium thiosulfate.

A modification of the process comprises in the first step introducing continuously oxygen containing sulfur dioxide into a circulated ammonia, ammonium bisulfite and ammonium sulfite containing ammonium thiosulfate solution maintained at a pH of from 5.5 to 7.0 and a temperature of from 60° to 80°C, and taking off the circulation system ammonium bisulfite and ammonium sulfite containing ammonium thiosulfate solution, and, in a second step, adding ammonia and sulfur, and recycling the sulfite-deficient ammonium thiosulfate solution into the first step.

A further modification of the process comprises converting the ammonium bisulfite being in the solution to ammonium sulfite by means of ammonia in a second step, and in a third step reacting the ammonium sulfite with sulfur.

The reaction of the process of the invention proceeds in the first step according to the following scheme:

$$2NH_3 + SO_2 + H_2O \rightleftarrows (NH_4)_2SO_3$$
$$NH_3 + SO_2 + H_2O \rightleftarrows (NH_4)HSO_3$$

The ratio of bisulfite to sulfite is controlled by the amount of $NH_3$.

In the subsequent second step, the ammonium thiosulfate solution saturated with ammonium sulfite and ammonium bisulfite is converted to ammonium thiosulfate according to the following scheme:

$$(NH_4)_2SO_3 + S \rightarrow (NH_4)_2S_2O_3$$
$$(NH_4)HSO_3 + S + NH_3 \rightarrow (NH_4)_2S_2O_3$$

This conversion of the second step may be carried out in one single as well as in two separated operations, which may be continuous or batchwise.

Advantageously, the solution is saturated with ammonium sulfite and ammonium bisulfite in the first step in such a manner that after the reaction of the second step a saturated mother liquor containing about 70 % of ammonium thiosulfate is obtained.

When from the crystallization an ammonium thiosulfate solution saturated at 20°C (about 60 % of ammonium thiosulfate is obtained for reuse in the first step, in this first step a solution is prepared which contains about 53 % of ammonium thiosulfate and 12.0 % of $SO_3^{--}$, and which consists of from about 55 to 75 % of sulfite and from 45 to 25 % of bisulfite. This ammonium sulfite/ammonium hydrosulfite ratio corresponds to a pH of from 5.5 to 7.0 in the reaction solution.

Under these process conditions, the formation of sulfate decreases at the same rate as the periods of contact with the oxygen containing $SO_2$ gas decrease. Therefore, for carrying out this process step, a reaction apparatus is suitable which ensures a gas/liquid contact time as short as possible, for example, a Venturi scrubber. Moreover, it is advantageous to keep the residence time of the reaction solution in the first step as short as possible, for example from 0.1 to 1 second in the reaction zone. This process may also be carried out under conditions in which the reaction solution exceeds the solubility limit. The salt obtained in this case does not disturb the operation of the apparatus.

The process is carried out at reaction temperatures of about 60° to 80°C. Intense cooling is therefore not necessary. From the heat balance results that a temperature of 70°C in the first step is advantageous for the further conversion in the second step. However, also another temperature range is possible when required for any reasons.

The apparatus is advantageously a Venturi scrubber.

The present invention will be further understood by reference to the FIGURE which shows a Venturi scrubber consisting of trap 1, in which the reaction solution to be saturated is fed in via supply duct 2. By means of circulation pump 3, the reaction solution is pumped to jet 5 of the Venturi scrubber, thereby passing heat exchanger 4. In jet 5, the reaction solution is distributed into the gas stream which is fed in via duct 6. Waste gas is let off via exhaust 7. $NH_3$ (8) is added also by means of pump 3. For further reaction in the second step, the reaction solution is discharged via duct 9 and forwarded to reactor 10, where the solution of the first step is converted to thiosulfate with the aid of $NH_3$ (supply duct 11) and sulfur (supply duct 12). The thiosulfate is forwarded via duct 13 into a crystallizer 15 which is drawn in broken lines. The ammonium thiosulfate mother liquor obtained in the crystallizer is recycled into the first step via duct 14 which is also drawn in broken lines.

The following examples illustrate the invention.

EXAMPLE 1

140.0 kg of a 64 weight % ammonium thiosulfate mother liquor containing 0.68 weight % of ammonium sulfate are introduced per hour into the first reaction step. For saturation of this solution with ammonium sulfite and ammonium bisulfite, an amount of gas of 43.8 $Nm^3$ ($Nm^3$=Standard cubic meter)per hour is introduced which contains 12 volume % of sulfur dioxide, 79 volume % of nitrogen and 9 volume % of oxygen. By feeding in 5.9 kg/h of $NH_3$, the pH is kept constant at 6.1 to 6.2. The amount of charge of the first step is 55 l, the amount circulated per hour 2.5 $m^3$. By cooling, the temperature is maintained at 61°C. A solution containing the following components is obtained:

| 56.9 | weight | % | of | ammonium | thiosulfate |
| 7.91 | weight | % | of | ammonium | sulfite |
| 0.70 | weight | % | of | ammonium | sulfate |
| 8.52 | weight | % | of | ammonium | bisulfite | which solution is forwarded to the second step. In this second step, the ammonium bisulfite is converted to ammonium sulfite by introducing 2.3 kg/h of ammonia. For the conversion of ammonium sulfite to ammonium thiosulfate, also 7.2 kg/h of sulfur are added, advantageously in regular little portions or continuously. In addition to this, a constant excess of about 1 to 2 weight % of sulfur is maintained in the reaction solution by introducing once a corresponding amount. The reaction time is 4 hours at 105°C; if necessary, this temperature is attained by heating. The reaction proceeds in a weakly alkaline medium (pH of from 7.5 to 8.0, measured at 20°C).

By this operation mode, a solution containing 74.9 weight % of ammonium thiosulfate is obtained. No ammonium sulfate is formed in the second step.

After filtration, the ammonium thiosulfate is separated from the mother liquor by crystallization. After removal of the crystallized portion, the mother liquor is recycled into the first step.

Under these conditions, an ammonium thiosulfate containing less than 1 % of ammonium sulfate is obtained.

EXAMAPLE 2

Under analogous operation conditions as indicated in Example 1, the batch of the first step is 182 kg/h of ammonium thiosulfate mother liquor containing 60.50 weight % of ammonium thiosulfate and 0.75 weight % of ammonium sulfate. 43.8 $Nm^3$ per hour of gas are introduced which contains 16 volume % of sulfur dioxide, 79 volume % of nitrogen and 5 volume % of oxygen. In addition, also 7.2 kg/h of $NH_3$ are introduced, which results in a pH of 6.4 to 6.5. The solution discharged from the first step contains

| 53.50 | weight | % | of | ammonium | thiosulfate |
| 6.18 | weight | % | of | ammonium | sulfite |
| 0.87 | weight | % | of | ammonium | sulfate |
| 9.85 | weight | % | of | ammonium | bisulfite |

Maintaining the conditions indicated in Example 1, an amount of ammonia of 3.6 kg/h is introduced as well as 9.8 kg/h of sulfur. 221.2 kg/h of ammonium thiosulfate solution containing 70.9 weight % of ammonium thiosulfate are obtained.

After crystallization, the mother liquor is recycled into the first step.

What is claimed is:

1. A process for the continuous manufacture of crystallized ammonium thiosulfate which comprises: reacting ammonia with oxygen containing sulfur dioxide in an ammonium thiosulfate solution to form ammonium bisulfite and ammonium sulfite at a pH of from 5.5 to 7.0 and a temperature of up to 80°C; and, in a second step, converting the ammonium bisulfite and ammonium sulfite in the solution formed with ammonia and sulfur to ammonium thiosulfate at a temperature of 105°C, said temperature being obtained by heating, if necessary.

2. A process as claimed in claim 1, which comprises in the first step introducing continuously oxygen containing sulfur dioxide into a circulated ammonia, ammonium bisulfite and ammonium sulfite containing ammonium thiosulfate solution maintained as a pH of from 5.5 to 7.0 and a temperature of from 60° to 80°C, and thereby forming ammonium bisulfite and ammonium sulfite containing ammonium thiosulfate solution; adding ammonia and sulfur to the solution formed to convert the ammonium bisulfite and ammonium sulfite to ammonium thiosulfate; removing ammonium thiosulfate from the solution by crystallization; and recycling the remaining solution to the first reaction step.

3. A process as claimed in claim 1, which comprises converting the ammonium bisulfite in the solution to ammonium sulfite by means of ammonia in a second step, and in a third step reacting the ammonium sulfite with sulfur.

\* \* \* \* \*